H. Benedict,
Cultivator.
No. 93,042.      Patented Jul. 27, 1869.
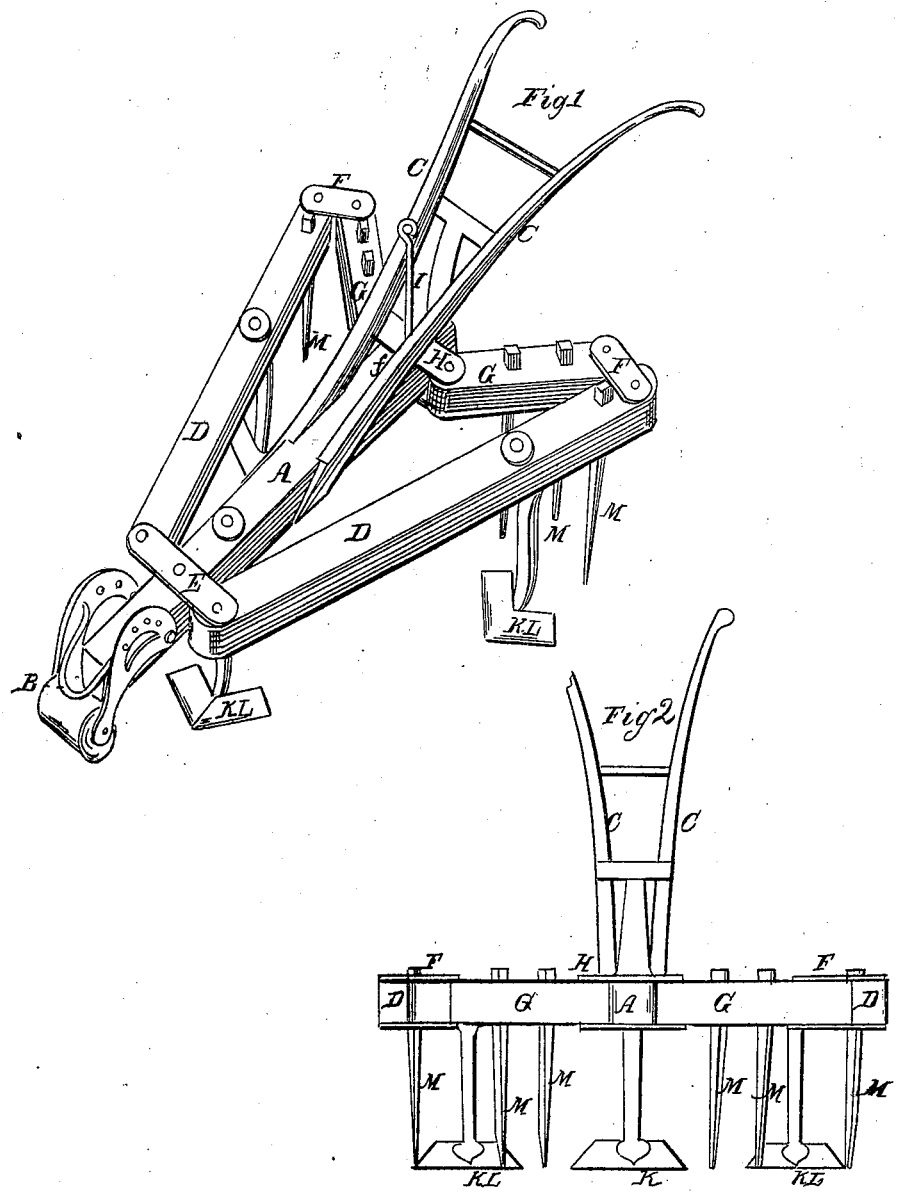

UNITED STATES PATENT OFFICE.

HIRAM BENEDICT, OF DETROIT, MICHIGAN, ASSIGNOR TO HIMSELF AND ALLEN CHANEY, OF SAME PLACE.

IMPROVEMENT IN CULTIVATOR AND HARROW COMBINED.

Specification forming part of Letters Patent No. 93,042, dated July 27, 1869; antedated July 16, 1869.

*To all whom it may concern:*

Be it known that I, HIRAM BENEDICT, of Detroit, in the county of Wayne and State of Michigan, have invented a new and useful Improvement in Cultivators and Harrows Combined; and I do declare that the following is a true and accurate description thereof, reference being had to the accompanying drawings, and to the letters of reference marked thereon, and being a part of this specification.

The nature of this invention is to furnish an addition of harrow-teeth to a proper frame, which also sustains cultivator-teeth, said frame being adjustable by means of proper hinges or pivots.

Figure 1 is a perspective view of the device. Fig. 2 is a rear view of the same.

Like letters refer to like parts in each figure.

A in the drawings represents a center longitudinal bar, to the front of which is attached a proper clevis, wheel, and quadrant, B, while to the rear end of said bar is secured the guiding-handles C.

D are side bars, pivoted by means of plates E to the center bar, A, at their front ends, while their opposite ends are pivoted by means of plates F to other bars, G, which in turn are pivoted to the plates H, which are so arranged as to form a thimble or slide which works upon the center bar, and is held in any desired position by the pin or bolt I, which, passing through said plates, H, enter one of a series of holes, J, in the center bar.

K is a cultivator-tooth, of any desired form, attached, by means of a suitable standard, to the center bar, A, at any suitable point.

K L are other cultivator-teeth, of similar form, one of which is attached to each of the side bars, D, in a similar manner. These teeth should be made of steel, and may be of any form, although I prefer them the shape of those shown in the drawings, being of a V shape, flat, the points declining toward the ground, while the back is slightly elevated.

I do not confine myself to three teeth, as shown, but will use any number that I may deem desirable for the work to be accomplished.

M are harrow-teeth of the ordinary construction, secured through the rear ends of the side bars, D, and through the other bars, G, in order the more thoroughly to pulverize the earth.

The bars G, instead of being pivoted as described, may be simply pivoted to the side bars, D, and so arranged that they will stand nearly at right angles, projecting inward, so that their inner ends may pass each other and be held in position by any clamp or other suitable device.

What I claim as my invention, and desire to secure by Letters Patent, is—

1. The center bar, A, the side bars, D, and other bars, G, when pivoted together and arranged relative to each other, as shown, for the purpose of expanding the implement.

2. The harrow-teeth M, in connection with the bars D and C and the cultivator-teeth K and L, when arranged substantially as and for the purposes herein set forth, described, and shown.

HIRAM BENEDICT.

Witnesses:
LOUIS C. HYDE,
GEORGE RUHLANDT.